(12) United States Patent
Liao et al.

(10) Patent No.: US 11,290,171 B2
(45) Date of Patent: Mar. 29, 2022

(54) METHOD AND APPARATUS FOR SIGNAL DETECTION IN A MIMO COMMUNICATION SYSTEM

(71) Applicant: Nokia Solutions and Networks Oy, Espoo (FI)

(72) Inventors: Zhijun Liao, Hangzhou (CN); Liang Xing, Hangzhou (CN); Junjie Zeng, Hangzhou (CN); Shenglin Shi, Hangzhou (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/771,154

(22) PCT Filed: Dec. 28, 2017

(86) PCT No.: PCT/CN2017/119399
§ 371 (c)(1),
(2) Date: Jun. 9, 2020

(87) PCT Pub. No.: WO2019/127216
PCT Pub. Date: Jul. 4, 2019

(65) Prior Publication Data
US 2021/0184752 A1    Jun. 17, 2021

(51) Int. Cl.
*H04B 7/08* (2006.01)
*H04B 7/0413* (2017.01)
(Continued)

(52) U.S. Cl.
CPC .......... *H04B 7/086* (2013.01); *H04B 7/0413* (2013.01); *H04B 7/0617* (2013.01);
(Continued)

(58) Field of Classification Search
CPC .... H04B 7/086; H04B 7/0413; H04B 7/0617; H04B 7/0697; H04B 7/0897; H04L 25/0204
See application file for complete search history.

(56) References Cited

U.S. PATENT DOCUMENTS

| 2005/0042988 | A1 | 2/2005 | Hoek et al. |
| 2010/0103917 | A1* | 4/2010 | Brown .............. H04W 56/0035 370/343 |

(Continued)

FOREIGN PATENT DOCUMENTS

| CN | 103718475 A | 4/2014 |
| CN | 105007106 A | 10/2015 |

(Continued)

OTHER PUBLICATIONS

Zhang et al., "Hybrid beamforming in uplink massive MIMO systems in the presence of blockers", IEEE International Conference on Acoustics, Speech and Signal Processing (ICASSP), 2017, pp. 6503-6507.

(Continued)

*Primary Examiner* — Janice N Tieu
(74) *Attorney, Agent, or Firm* — Harrington & Smith

(57) ABSTRACT

Embodiments of the present disclosure relate to methods and apparatuses for signal detection in a MIMO communication system. A receiver device according to an embodiment of the present disclosure comprises a remote unit and a baseband unit. The remote radio unit is configured to receive a first set of signals from a first number of receiving antennas, and the baseband unit comprises: an interfacing unit, configured to obtain the first set of signals from the remote radio unit; a beamforming unit, configured to generate a second set of signals associated with a second number of virtual antennas by performing receiving beamforming for the obtained first set of signals, the second number being less than the first (Continued)

number; and a detecting unit, configured to detect the second set of signals generated by the beamforming unit. Embodiments of the present disclosure may reduce complexity of signal detection and cost of implementation.

16 Claims, 5 Drawing Sheets

(51) Int. Cl.
  *H04B 7/06* (2006.01)
  *H04L 25/02* (2006.01)
(52) U.S. Cl.
  CPC ......... *H04B 7/0697* (2013.01); *H04B 7/0897* (2013.01); *H04L 25/0204* (2013.01)

(56) References Cited

U.S. PATENT DOCUMENTS

| | | | |
|---|---|---|---|
| 2010/0254474 A1 | 10/2010 | Gomadam et al. | |
| 2011/0286341 A1 | 11/2011 | Sanayei et al. | |
| 2014/0362946 A1 | 12/2014 | Kakishima et al. | |
| 2015/0124688 A1 | 5/2015 | Xu et al. | |
| 2016/0315674 A1 | 10/2016 | Li et al. | |
| 2017/0163327 A1 | 6/2017 | Yang et al. | |
| 2019/0268804 A1* | 8/2019 | Estella Aguerri | H04W 28/06 |
| 2019/0280908 A1* | 9/2019 | Cai | H04B 17/14 |
| 2020/0137835 A1* | 4/2020 | Estella Aguerri | H04B 7/0456 |

FOREIGN PATENT DOCUMENTS

| | | |
|---|---|---|
| CN | 105991172 A | 10/2016 |
| WO | 2017/107016 A1 | 6/2017 |
| WO | 2017/107054 A1 | 6/2017 |

OTHER PUBLICATIONS

Schuler et al., "Tapering of Multitransmit Digital Beamforming Arrays", IEEE Transactions on Antennas and Propagation, vol. 56, No. 7, Jul. 2008, pp. 2125-2127.

Islam et al., "Adaptive Beamforming with 16 Element Linear Array Using MaxSIR and MMSE Algorithms", IEEE International Conference on Telecommunications and Malaysia International Conference on Communications, May 14-17, 2007, pp. 165-170.

International Search Report and Written Opinion received for corresponding Patent Cooperation Treaty Application No. PCT/CN2017/119399, dated Sep. 30, 2018, 9 pages.

Extended European Search Report received for corresponding European Patent Application No. 17935834.6, dated Jul. 7, 2021, 9 pages.

* cited by examiner

METHOD AND APPARATUS FOR SIGNAL DETECTION IN A MIMO COMMUNICATION SYSTEM

RELATED APPLICATION

This application claims priority to PCT Application No. PCT/CN2017/119399, filed on Dec. 28, 2017, which is incorporated herein by reference in its entirety.

FIELD

Non-limiting and example embodiments of the present disclosure generally relate to a technical field of wireless communication, and specifically to methods and apparatuses for signal detection in a multiple input multiple output (MIMO) communication system.

BACKGROUND

This section introduces aspects that may facilitate better understanding of the disclosure. Accordingly, the statements of this section are to be read in this light and are not to be understood as admissions about what is in the prior art or what is not in the prior art.

Wireless communication systems target at high spectrum efficiency and high system capacity. MIMO techniques have been known as an effective way for meeting the target. To further enhance spectrum efficiency, a concept of massive MIMO (mMIMO) has been proposed.

mMIMO means that a huge number of antennas are deployed in a wireless communication system. Typically, the number of antennas deployed at the base station may be, for example, 64, 128 or 256. In some scenarios, even more antenna elements collocated or distributed may be deployed in the mMIMO system.

mMIMO technique has been considered as a key technology in, for example, Long Term Evolution-Advanced (LTE-A) Pro and the fifth generation (5G) wireless communication system, and it may increase the spectral efficiency by 5 to 10 times in theory.

On the other hand, an increase in antenna number brings challenges to data processing at the receiver side and causes significant cost growth in the receiver due to increased amount of data to be processed.

SUMMARY

Various embodiments of the present disclosure mainly aim at providing methods and apparatuses for signal detection in a MIMO communication system.

In a first aspect of the disclosure, there is provided a method implemented at a receiver device. The method comprises obtaining a first set of signals from a first number of receiving antennas; generating a second set of signals associated with a second number of virtual antennas by performing receiving beamforming (BF) for the first set of signals, the second number being less than the first number; and detecting the second set of signals.

In an embodiment, obtaining the first set of signals may comprise receiving, at a baseband unit of the receiver device, the first set of signals from a remote radio unit of the receiver device; and generating and detecting the second set of signals may comprise generating and detecting the second set of signals at the baseband unit of the receiver device.

In another embodiment, performing receiving beamforming for the first set of signals may comprise obtaining a third set of signals by transforming the first set of signals from time domain to frequency domain; and performing the receiving beamforming for the third set of signals.

In still another embodiment, obtaining the first set of signals may comprise obtaining, at a remote radio unit of the receiver device, the first set of signals from the first number of receiving antennas; generating the second set of signals may comprise generating the second set of signals at the remote radio unit; and detecting the second set of signals may comprises obtaining, at a baseband unit of the receiver device, the second set of signals from the remote radio unit, and detecting the second set of signals at the baseband unit.

In some embodiments, performing receiving beamforming for the first set of signals may comprise generating beamforming weights based on reference signals received from the first number of receiving antennas.

In some embodiments, performing receiving beamforming for the first set of signals may comprises performing receiving beamforming based on correlation of the first number of receiving antennas.

In a further embodiment, detecting the second set of signals may comprise obtaining channel estimation for the second set of signals; and performing equalization and decoding for the second set of signals based on the obtained channel estimation.

In a second aspect of the disclosure, there is provided a receiver device. The receiver device comprises a remote unit and a baseband unit, wherein the remote radio unit is configured to receive a first set of signals from a first number of receiving antennas; and the baseband unit comprises: an interfacing unit, configured to obtain the first set of signals from the remote radio unit; a beamforming unit, configured to generate a second set of signals associated with a second number of virtual antennas by performing receiving beamforming for the obtained first set of signals, the second number being less than the first number; and a detecting unit, configured to detect the second set of signals generated by the beamforming unit.

In a third aspect of the disclosure, there is provided another receiver device. The receiver device comprises a remote unit and a base unit. The remote radio unit comprises a receiving unit configured to receive a first set of signals from a first number of receiving antennas, and a beamforming unit coupled to the receiving unit and configured to generate a second set of signals associated with a second number of virtual antennas by performing receiving beamforming for the first set of signals, the second number being less than the first number. The base band unit comprises an interfacing unit configured to obtain the second set of signals from the remote radio unit, and a detecting unit coupled to the interfacing unit and configured to detect the second set of signals.

Embodiments of the present disclosure may reduce complexity of signal detection and cost of implementation.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1:
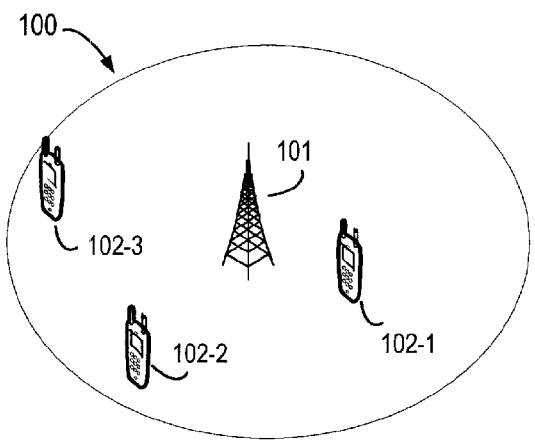
FIG. 1 illustrates an example wireless communication network in which embodiments of the present disclosure may be implemented.

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network device" refers to a node in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (JOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink (DL) transmission refers to a transmission from a network device to UE, and an uplink (UL) transmission refers to a transmission in an opposite direction. That is, in DL, the network device is a transmitter and the UE is a receiver device; while in UL, the UE is a transmitter and the network device is a receiver device.

FIG. 1 illustrates an example wireless communication network 100 in which embodiments of the present disclosure may be implemented. As shown, the wireless communication network 100 may include one or more network devices, for example, network device 101. The network device 101 may be in a form of a base station (BS), a Node B (NB), an evolved NB (eNB), a gNB, a virtual BS, a Base Transceiver Station (BTS), or a Base Station Subsystem (BSS), AP and the like.

In this example, network device 101 provides radio connectivity to a set of UEs 102-1, 102-2, and 102-3, which is collectively referred to as "UE(s) 102", within its coverage. It should be appreciated that in some embodiments, the network device may provide service to less or more UEs and the number of UEs in this shown example does not suggest any limitations as to the scope of the present disclosure.

In some embodiments, a network device, e.g., the network device 101 in FIG. 1, may be equipped with a plurality of transmitting antennas, and/or a plurality of receiving antennas, and serve UEs within its coverage with the plurality of antennas. Likewise, in some embodiments, some or all of the UEs 102 may be equipped with a plurality of antennas for transmitting and/or receiving. In addition, a plurality of UEs 102 may be scheduled to transmit or receive in a same or overlapped time-frequency resource, thereby forming a multi-user MIMO (MU-MIMO) scheme. Accordingly, in some scenarios, a receiver device (which may be a network device or a UE) may be required to detect signals transmitted from a plurality of antennas.

Figure 2:
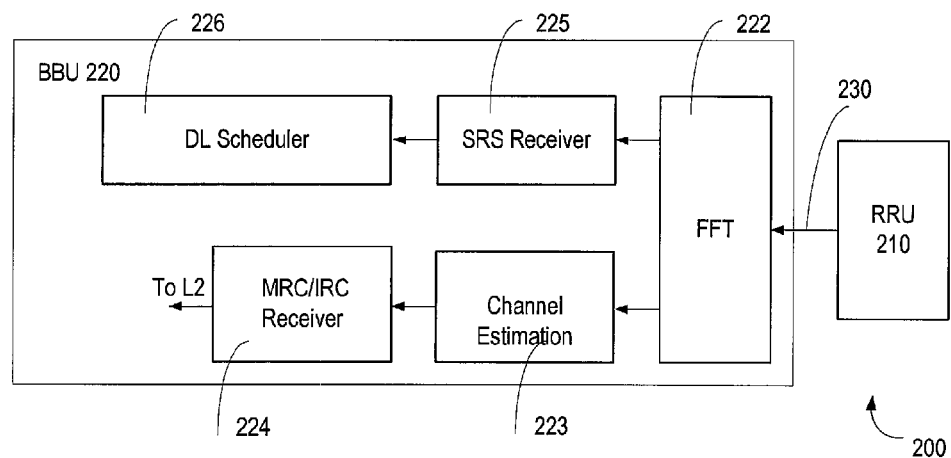
FIG. 2 shows a legacy receiver structure for a base station in an orthogonal frequency division multiplexing (OFDM) based system.

A receiver device (for example, a base station) usually comprises a baseband unit (BBU) and a remote radio unit (RRU). FIG. 2 shows a basic receiver structure 200 for a base station in an orthogonal frequency division multiplexing (OFDM) based system, for example a long term evolution (LTE) system. In the example receiver structure 200, the RRU 210 transmits time domain digital in-phase/quadrature (I/Q) data received from each antenna to BBU 220 through a so-called Reference Point 3 (RP3) interface, for example an Open Base Station Architecture Initiative (OBSAI) link or Common Public Radio Interface (CPRI) link 230 running on fibers. Then, the I/Q data from all receiving antennas are transformed from time domain to frequency domain through a Fast Fourier Transform (FFT) block 222, and fed to channel estimation block 223 and Maximum Ratio Combining (MRC)/Interference Rejection combining (IRC) receiver block 224. The channel estimation block 223 performs channel estimation based on uplink demodulation reference signals (DMRS) and the MRC/IRC receiver block 224 conducts frequency domain equalization based on an MRC or IRC algorithm and performs decoding (for example Turbo decoding) of the equalized data.

In the example shown in FIG. 2, the receiver structure 200 also includes a sounding reference signal (SRS) receiver 225 and a DL scheduler 226. The SRS receiver 225 obtains channel estimation based on the SRS from the UEs, and the DL scheduler 226 determines scheduling parameters for DL transmissions. For instance, the DL scheduler 226 may calculate a covariance matrix of a channel based on the channel estimation obtained at the SRS receiver 225 and compute Eigen beamforming weights for a downlink transmission (with e.g. transmission mode 7 and transmission mode 8 specified in LTE Time Division Duplex (TDD)).

The receiver structure shown in FIG. 2 works well with a small number of receiving antennas (e.g. 2, 4 or 8 antennas). Both the digital signal processing (DSP) resources and the fronthaul bandwidth requirement are acceptable from cost perspective when the number of receiving antennas is small, since the overall I/Q data amount to be handled is relatively small in this case. However, for massive MIMO, the number of antennas increases dramatically (e.g. from 8 to 64, 128 or 256), and the I/Q data volume grows exponentially with the number of antennas. As a result, the requirement on both DSP resource and fronthaul bandwidth increases significantly.

In particular, to support an mMIMO system with the receiver structure 200 shown in FIG. 2, much more digital I/Q data will be exchanged between the BBU 220 and the RRU 210 through the OBSAI or CPRI link 230, which means that much more transport bandwidth (fibers) of the OBSAI or CPRI based fronthaul 230 will be required to carry a huge amount of I/Q data.

In addition, with the increase in the number of antennas, more DSP resources will be required at the BBU 220 for processing the I/Q data received in uplink direction, for example in the blocks 222-226. For instance, when the number of antennas grows from 8 to 64, 8 times of DSP resources and 8 times of fronthaul bandwidth will be required compared to a legacy communication system with 8 receiving antennas. Additionally, more advanced and complicated algorithms may be utilized to support higher-order multi-user MIMO in the mMIMO system, leading to additional DSP resource requirement.

The most straightforward way to support massive MIMO in uplink is to add more bandwidth to the fronthaul link, so that the increased amount of I/Q data can be transmitted from the RRU to the BBU of the receiver device directly. It means that more fibers and Small Form-factor Pluggable units (SFPs) are needed to connect BBU and RRU. At the same time, more DSP resources are needed at the BBU side to handle the huge amount of I/Q data (which is about 8 times for 64 antenna case compared with a MIMO receiver with 8 antennas). In summary, to support a massive MIMO system with the traditional receiver structure 200 shown in FIG. 2, hardware costs will be increased dramatically.

To solve at least a part of the above problems, methods and apparatuses have been proposed in the present disclosure. Some embodiments of the present disclosure aims at introducing a low-cost receiver which may be applied to, for example, a massive MIMO system, by taking advantage of signal propagation characteristic of a highly correlated antenna array. In some embodiments, by applying some calculated beamforming weights to the highly correlated antenna elements, a desired beam to a direction of an interested user may be formed. In this way, a large number of antennas in uplink may be "compressed" to a small number of virtual antennas with limited power loss. As a result, the amount of data to be processed is reduced and the requirement on fronthaul bandwidth and/or DSP resources for uplink channel estimation and data detection may be reduced.

Figure 3:
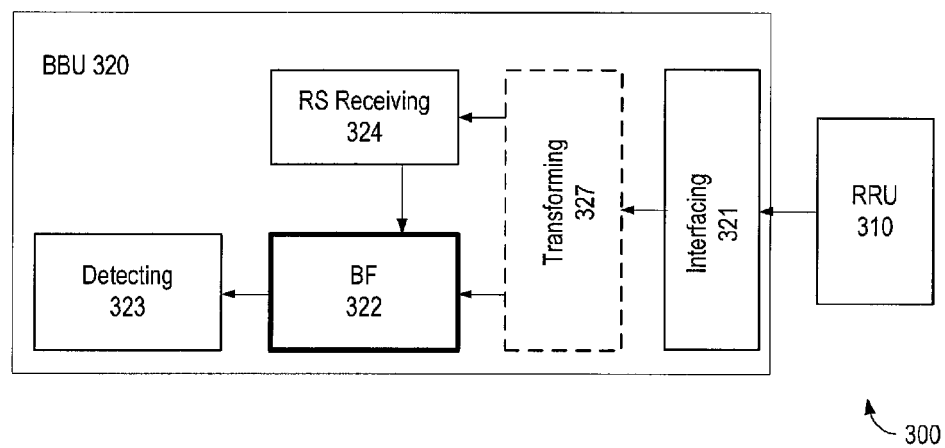
FIG. 3 shows a block diagram of a receiver device according to an embodiment of the present disclosure.

FIG. 3 shows a block diagram of a receiver device 300 according to an embodiment of the present disclosure. The receiver device 300 may be, for example, the network device 101 or UE 102 shown in FIG. 1. For ease of discussion, the method 300 will be described below with reference to network device 101 and the communication network 100 illustrated in FIG. 1. However, embodiments of the present disclosure are not limited thereto.

As shown in FIG. 3, the receiver device 300 comprises a remote unit (RRU) 310 and a baseband unit (BBU) 320. The RRU 310 is configured to receive a first set of signals from a first number of receiving antennas. For instance, in an mMIMO system, the first number may be 64, 128 or even 256. The BBU 320 comprises an interfacing unit 321, a beamforming unit 322, and a detecting unit 323. The first set of signals may include data and/or control signals, for example Physical Uplink Shared Channel (PUSCH) and/or Physical Uplink Control Channel (PUCCH) signals from one or more terminal devices 102.

The interfacing unit 321 is configured to obtain the first set of signals from the RRU 310. Without limitation, the interfacing unit 321 may obtain the first set of signals from the RRU via an OBSAI or CPRI link running on fibers.

The beamforming unit 322 is configured to generate a second set of signals associated with a second number of virtual antennas by performing receiving beamforming for the obtained first set of signals. The second number is less than the first number, which means that the large number of receiving antennas is compressed to a small number of virtual antennas, resulting in less signals to be processed in the detecting unit 323. For example, 64, 128 or even 256 receiving antennas may be compressed to 4 virtual antennas.

In an embodiment, the beamforming unit 322 may be configured to perform receiving beamforming based on correlation of the first number of receiving antennas. A principle behind this embodiment is that highly correlated antenna elements in an antenna array may form one or more virtual beams to the direction of an interested user, with most signal energy for the user kept in the virtual beams. For example, in uplink direction, by combining I/Q data from selected highly correlated receiving antennas with proper Eigen beamforming weights, the second number of virtual antennas may be formed with only limited power loss. The power loss decreases with the increase of the antenna correlation. Or in other words, the receiving beamforming provides better performance for receiving antennas with higher correlation. The beamforming also makes it possible to adopt a multi-user MIMO scheme with spatial multiplexing.

Alternatively or in addition, in some embodiments, the baseband unit 320 may further comprise a reference signal (RS) receiving unit 324 coupled to the interfacing unit 321. The RS receiving unit 324 is configured to obtain RSs from the first number of receiving antennas. As an example rather than limitation, the RS may be demodulation RS (DMRS) or sounding RS (SRS) from a terminal device 102 shown in FIG. 1. In an embodiment, the beamforming unit 322 may be coupled to the RS receiving unit 324 and configured to generate beamforming weights based on received RSs.

Embodiments of the present disclosure are not limited to any specific way for performing the receiving beamforming, and just for illustration purpose, an example will be provided below. In the example, the first number of receiving antennas which may form an antenna array are split into M sub-arrays, for example based on correlation of the antennas. Without limitation, the antenna array formed by the first number of receiving antennas may be split into M sub-arrays based their polarization and/or positions. In an embodiment, the antennas included in each sub-array are highly correlated, and may be utilized to form a virtual antenna via beamforming.

Figure 4:
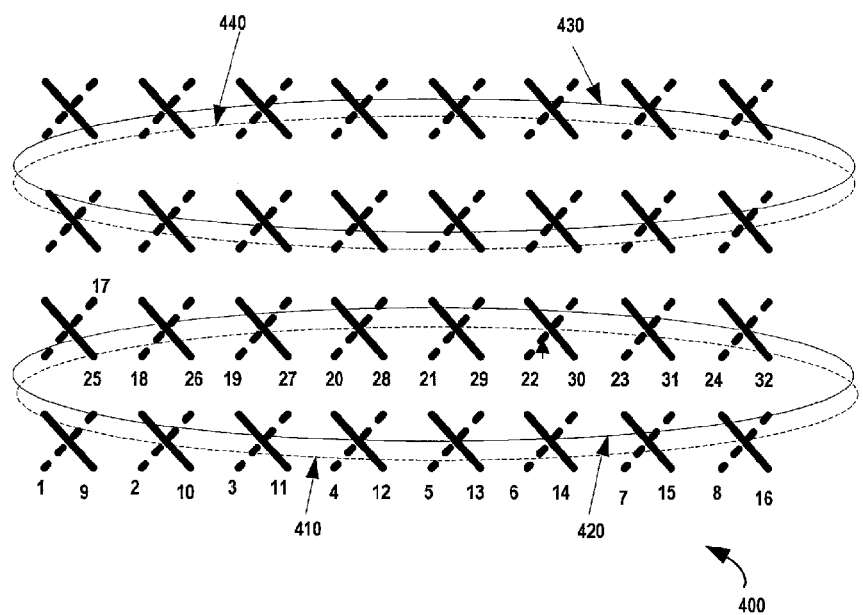
FIG. 4 shows an example of antenna array splitting for receiving beamforming according to an embodiment of the present disclosure.

An example of antenna array splitting is illustrated in FIG. 4. In this example, the antenna array 400 comprising 64 antennas (or antenna elements) with cross polarization is divided into 4 sub-arrays 410-440. Each sub-array contains 16 antennas with the same polarization in two consecutive rows to guarantee high correlation of antennas within each sub-array. For example, antennas with indexes 1-8, and 17-24 form the sub-array 410, and antennas with indexes 9-16 and 25-32 form the sub-array 420. Sub-arrays 430 and 440 are formed likewise. Note that in FIG. 4, the antennas denoted with solid line are polarized in one direction while antennas denoted with dashed line are polarized in another direction.

I/Q data from each sub-array will be fed to the BBU 320 for further processing. In the beamforming unit 322, long term beamforming weights $W_{i,m}$ may be generated for user i and sub-array m based on channel covariance matrix $R_{i,m}$, which may be obtained by:

$$R_{i,m} = E[\widehat{h_{i,m}} \widehat{h_{i,m}}^H] \quad (1)$$

As an example rather than limitation, $R_{i,m}$ may be obtained based on statistic of RSs received at RS receiving unit 324.

Embodiments are not limited to any specific algorithm for obtaining the beamforming weights $W_{i,m}$ based on the channel covariance matrix $R_{i,m}$. For performance optimization, some advanced or optimized algorithm may be used. For example, the tapering algorithm proposed by Karin Schuler et al. in "Tapering of Multitransmit Digital Beamforming Arrays" published in IEEE TRANSACTIONS ON ANTENNAS AND PROPAGATION, VOL. 56, NO. 7, 2008, or the maximum signal to interference ratio (maxSIR) algorithm proposed by Md. Rafiqul Islam et al. in "Adaptive Beamforming with 16 Element Linear Array Using MaxSIR and MMSE Algorithms" published in Proceedings of the 2007 IEEE International Conference on Telecommunications and Malaysia International Conference on Communications, page 14-17 may be utilized to avoid the interference between users in multi-user MIMO case.

For each sub-array in (m=0, 1, . . . , M−1) and each user i (i=0, 1, . . . , I−1), where M is the total number of sub-arrays and I is the total number of users being scheduled, a receiving beam is formed, and the signal generated for the beam m may be represented by:

$$y_{n,m,i} = \sum_{j=0}^{N-1} w_{i,m} x_{n,j} \quad (2)$$

where N is the total number of physical antennas in each sub-array, j represents index of a receiving antenna in the sub-array, n is the subcarrier index. $y_{n,m,i}$ is one of the second set of signals obtained via beamforming, while $x_{n,j}$ represent one of the first set of signals received from the antenna j of the first number of receiving antennas and subcarrier n. $\Sigma$ represents a sum operation. In this way, only M signals (i.e., the second set of signals) corresponding to M virtual antennas will be output to the detecting unit 323 for further processing. The amount of data to be processed is greatly reduced.

In some embodiments, the detecting unit 323 may comprise a channel estimation unit configured to obtain channel estimation for the second set of signals, and a decoding unit configured to perform equalization and decoding for the second set of signals based on the obtained channel estimation. The channel estimation unit and the decoding unit may be implemented in a similar ways as the channel estimation block 223 and MRC/IRC receiver block 224 shown in FIG. 2. For example, the decoding unit may be implemented as a conventional MRC/IRC receiving unit for 4 receiving antennas, for signal equalization and decoding.

It should be appreciated that, additional or different data processing units may be included in the detecting unit 323 in some other embodiments, depending on transmitting processing utilized at the transmitter device side.

Optionally, in some embodiments, the receiver device 300 may further comprise a transforming unit 327 connected between the interfacing unit 321 and the beamforming unit 322. The transforming unit 327 is configured to obtain the first set of signals from the interfacing unit 321, generate a third set of signals by transforming the first set of signals from time domain to frequency domain, and output the third set of signals to the beamforming unit 322. That is, in this case, the beamforming unit 322 is not configured to performing beamforming based on the first set of signals directly, but configured to perform the beamforming for the third set of signals derived from the first set of signals. In an embodiment, the receiver device 300 may be used in an OFDM bases system, and in this case, the transforming unit 327 may be a Discrete Fourier Transformation (DFT) unit or a Fast Fourier Transform (FFT) unit.

Figure 5:
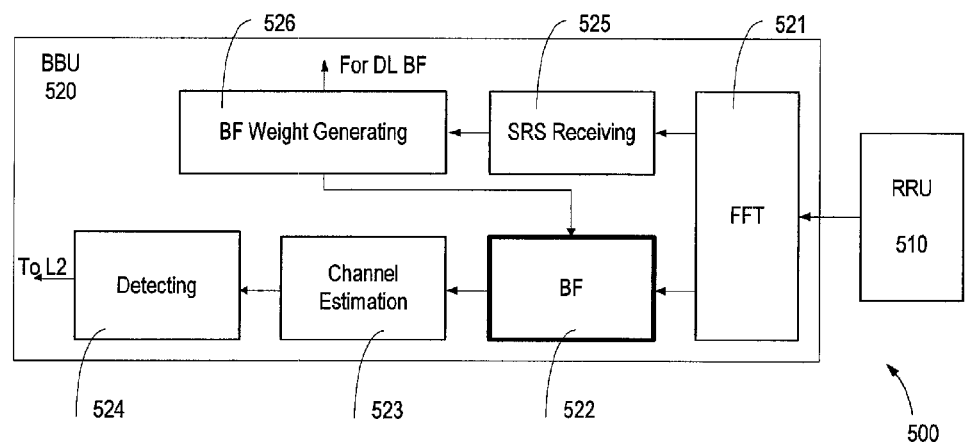
FIGS. 5-7 show block diagrams of receiver devices according to some embodiments of the present disclosure.

FIG. 5 shows a block diagram of another receiver device 500, which may be considered as an example implementation of the receiver device 300 with the FFT unit. The receiver device 500 may be utilized, for example, in an OFDM system for LTE massive MIMO.

As shown in FIG. 5, the receiver device 500 comprises a RRU 510 and a BBU 520. The BBU 520 comprises FFT unit 521, which is configured to perform an FFT operation for the first set of signals obtained from the RRU 510 through an OBSAI or CPRI link. Frequency domain signals output from the FFT unit 521 is fed to the beamforming unit 522 and the SRS receiving unit 525. The SRS receiving unit 525 extracts SRS signals from the received signals and outputs them to the beamforming weight generating unit 526 for generating beamforming weight based on the statistic of the SRS signals. For example, the beamforming weight generating unit 526 may generate the beamforming weights based on a channel covariance matrix estimated from the SRS signals. The beamforming weights output from the beamforming weight generating unit 526 are fed to the beamforming unit 522 for generating a second set of beamformed signals. In some embodiments, the beamforming weight generating unit 526 may be further configured to generate beamforming weights for downlink transmission.

The second set of beamformed signals are passed to the channel estimation unit 523 where channel estimation are obtained based on, for example, uplink DMRS. Both the channel estimation and the second set of signals are fed to the detecting unit 524 which is configured to conduct frequency domain equalization (for example, with MRC or IRC algorithm) and Turbo decoding. The detecting unit 524 may pass the detected signal to layer 2 (L2) for further processing.

In both receiver devices 300 and 500, by introducing a beamforming unit (322, 522) into the BBU (320, 520), the volume of signals fed to the detecting unit (323, 524) may be greatly reduced. As a result, resource required for digital signal processing (DSP) is kept at an acceptable level. That is, the receiver devices 300 and 500 is able to handle large amount of I/Q data with only limited DSP resource (just like a legacy 4RX/8RX receiver) by transforming the large amount of I/Q data into a small number of beams.

The receiver device shown in FIG. 3 or 5 solves the DSP resource issue at the BBU side; however, it still requires a high bandwidth for fronthaul connection. In some embodiments, by implementing the beamforming unit in the RRU of the receiver device, both the DSP resource requirement and the fronthaul bandwidth requirement may be significantly reduced. For illustration rather than limitation, an example receiver device with such structure is shown in FIG. 6.

Figure 6:
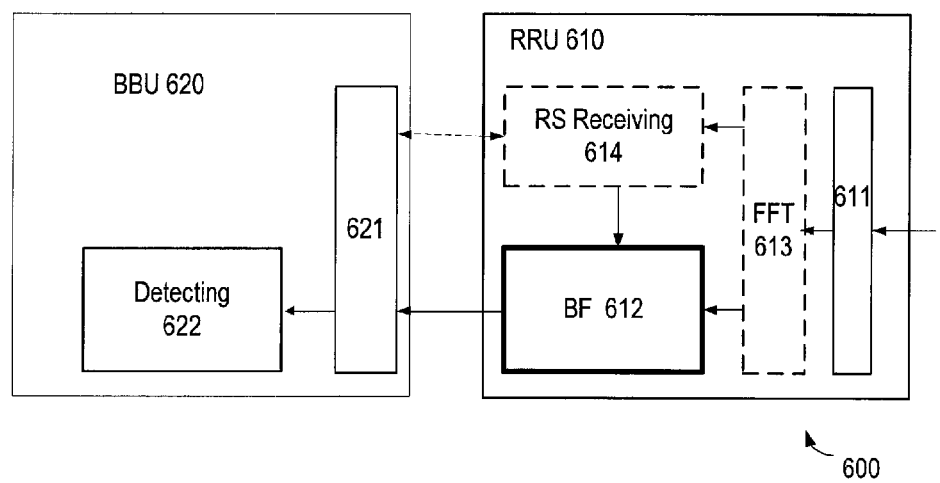

As shown in FIG. 6, the receiver device 600 comprises an RRU 610 and a BBU 620. The RRU 610 comprises a receiving unit 611 configured to receive a first set of signals from a first number of receiving antennas, and a beamforming unit 612 coupled to the receiving unit 611 and configured to generate a second set of signals associated with a second number of virtual antennas by performing receiving beamforming for the first set of signals. The second number is less than the first number.

Different from the structure shown in FIG. 5, the beamforming unit 612 of the receiver device 600 is located in the RRU 610. It means that data transferred from the RRU 610 to the BBU 620 via the fronthaul (for example, OBSAI or CPRI) link are beamformed signals with reduced data volume. As a result, the fronthaul link is not required to support transmission of a large amount of signals for up to 256 receiving antennas, but only required to support transmission of a small amount of signals for 4 virtual antennas, for example.

In some embodiments, the RRU may optionally comprise a FFT unit 613 connected between a receiving unit 611 and the beamforming unit 612, and is configured to obtain the first set of signals from the receiving unit, generate a third set of signals by transforming the first set of signals from time domain to frequency domain, and output the third set of signals to the beamforming unit 612. However, it should be appreciated that the FFT unit 613 may be omitted from the receiver device 600 in some embodiments, if the receiver device 600 is not utilized in an OFDM-based system.

In an embodiment, the RRU 610 may further comprise a reference signal receiving unit 614 coupled to the receiving unit 611 and configured to obtain reference signals from the first number of receiving antennas. In the embodiment, the beamforming unit 612 is further coupled to the reference signal receiving unit 614 and configured to generate beamforming weights based on received reference signals (e.g., SRS or DMRS).

Embodiments of the present disclosure are not limited to any specific implementation of the beamforming unit 612. For example rather than limitation, the beamforming unit 612 may be configured to perform receiving beamforming based on correlation of the first number of receiving antennas. Alternatively or in addition, the beamforming unit 612 may comprise or coupled to a beamforming weight generating unit (now shown), and the beamforming weight generating unit may be configured to generate beamforming weights based on, for example, a channel covariance matrix which may be derived from received reference signals.

As shown in FIG. 6, the BBU 620 of the receiver device 600 comprises an interfacing unit 621 configured to obtain the second set of signals from the RRU 610, and a detecting unit 622 coupled to the interfacing unit 621 and configured to detect the second set of signals. The detecting unit 621 may be implemented in a similar ways as the corresponding unit 323 or 524 shown in FIG. 3 or FIG. 5, and therefore details will not be repeated. As an example, the detecting unit may comprise a channel estimation unit, an equalization unit and a decoding unit.

Figure 7:
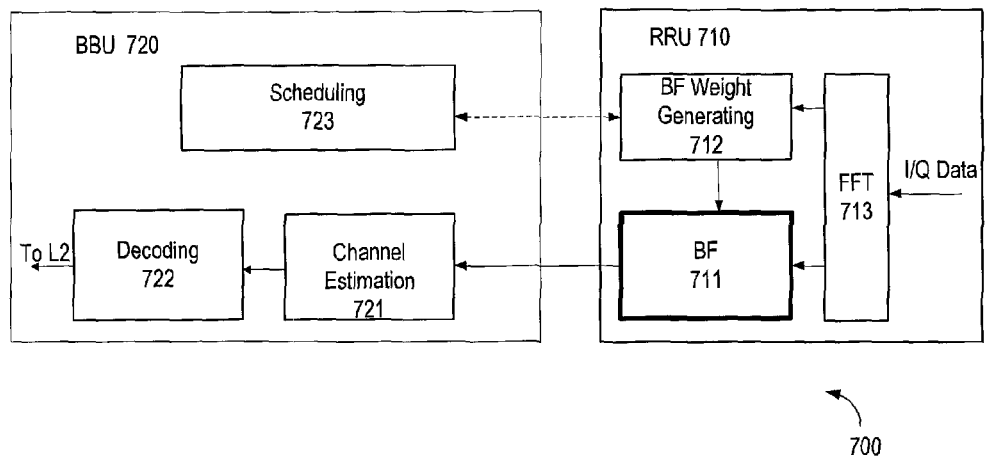

FIG. 7 shows a block diagram of a receiver device 700 which may be considered as an example implementation of the receiver device 600. The receiver device may be utilized in an OFDM based system, for example.

As shown in FIG. 7, the receiver device 700 comprises a RRU 710 and a BBU 720. The RRU 710 comprises a beamforming unit 711, a beamforming weight calculating unit 712 and an FFT unit 713. Units 711-713 may be configured to perform operations similar to that described with reference to units 522, 526 and 521 of FIG. 5.

Note that though the beamforming weight calculating unit 712 is shown as a unit separate from the beamforming unit 711, it may be implemented as a portion of the beamforming unit 711 in some embodiments. Alternatively, in another embodiment, the beamforming weight calculating unit 712 may be implemented in the BBU 720, and in this case, the beamforming weights output from the beamforming weight calculating unit 712 may be transmitted to the beamforming unit 711 via the fronthaul link.

Furthermore, in the example shown in FIG. 7, the BBU 720 comprises a channel estimation unit 721 configured to obtain channel estimation for the second set of signals, a decoding unit 722 configured to perform equalization and decoding for the second set of signals based on the obtained channel estimation and a scheduling unit 723. The channel estimation unit 721 and the decoding unit 722 may form the detecting unit 622 in FIG. 6. The decoding unit 722 may transfer the decoded data to an upper layer, for example L2. The scheduling unit 723 may be configured to control the beamforming operation for both uplink (e.g., PUSCH) and downlink (e.g., PDSCH).

For the proposed receiver structure, only a small number of BBU boards (or DSP resources) are required for supporting a massive MIMO cell that is equipped with a large antenna array. Furthermore, in some embodiments, only a very small number of fibers are required to connect the BBU and the RRU of a receiver device serving a massive MIMO cell that equipped with a large antenna array.

Figure 8:
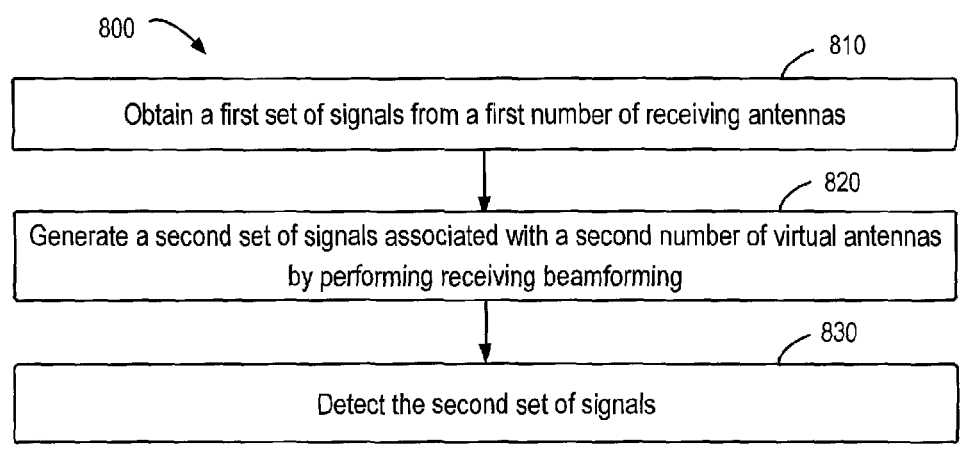
FIG. 8 shows a flowchart of a method at a receiver device for signal detection according to an embodiment of the present disclosure.

Reference is now made to FIG. 8, which shows a flow chart of a method 800, which may be implemented in a receiver device, for example, the network device 101 or UE 102 shown in FIG. 1. For ease of discussion, the method 800 will be described below with reference to network device 101 and the communication network 100 illustrated in FIG. 1. However, embodiments of the present disclosure are not limited thereto.

At block 810, the network device 101 obtains a first set of signals from a first number of receiving antennas. In an embodiment, the network device 101 may receive, at its BBU, the first set of signals from its RRU. The RRU is coupled to or comprise the first number of receiving antennas.

At block 820, the network device 101 generates a second set of signals associated with a second number of virtual antennas by performing receiving beamforming for the first set of signals. The second number (for example, 4 or 8) is less than the first number (for example, 64 or 128).

In an embodiment, the network device 101 may generate the second set of signals with its BBU. In this case, the network device 101 may have a structure similar to that shown in FIG. 3 or 5.

Alternatively, in an embodiment, at block 820, the network device 101 may obtain, at its RRU, the first set of signals from the first number of receiving antennas. Then at block 820, the network device 101 may generate the second set of signals at the RRU. In this case, the network device 101 may have a structure similar to that shown in FIG. 6 or 7.

In some embodiments, the network device 101 may generate the second set of signals by directly performing beamforming for the first set of signals. In some other embodiments, the network device 101 may generate the second set of signals by performing beamforming for a third set of signals which are derived from the first set of signals via a time domain to frequency domain transformation (for example though a FFT operation). That is, in some embodiments, at block 820, the network device 101 may obtain a third set of signals by transforming the first set of signals from time domain to frequency domain; and performing the receiving beamforming for the third set of signals.

The network device 101 may perform beamforming using any proper algorithm. For illustration rather than limitation, the network device 101 may generate beamforming weights based on RSs (for example, SRS or DMRS) received from the first number of receiving antennas. Alternatively or in addition, the network device 101 may perform receiving beamforming based on correlation of the first number of receiving antennas. Descriptions provided above with reference to FIG. 3-7 also apply here and details will not be repeated.

At block 830, the network device 101 detects the second set of signal. Depending on the transmitting processing performed at the transmitter side, the detection at the network device 101 may be different. Generally speaking, reverse operations corresponding to the transmitting processing may be performed at block 830. In an embodiment, at block 830, the network device 101 may obtain channel estimation for the second set of signals, and perform equalization and decoding for the second set of signals based on the obtained channel estimation.

Since the second set of signals are beamformed signals corresponding to a small number of virtual antennas, the DSP resource required by the detection operation at block 830 is greatly reduced compared with detecting the first set of signals corresponding to the large number of receiving antennas directly.

In some embodiments, the second set of signals is obtained from the RRU of the network device. In these embodiments, the requirement on fronthaul link bandwidth is relaxed, since only a small amount of data are exchanged via the fronthaul link.

Figure 9:
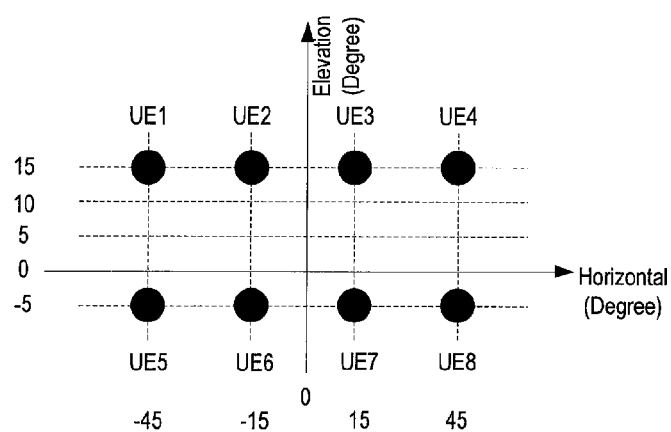
FIG. 9 shows performance evaluation results of a receiver device according to an embodiment of the present disclosure.

Link level simulation is conducted to evaluate performance of a receiver device according to an embodiment of the present disclosure, and evaluation results for detection performance are shown in Table 1. In the simulation, it is assumed that tapering and maxSIR algorithms are adopted to generate the beamforming weight for an 8-layer multi-user MIMO scenario, where each user is located in a different DOA as shown in FIG. 9. Table 1 shows the signal to noise ratio (SNR) in dB required to achieve a 10% block error rate (BLER) for multi-user-IRC and single-user IRC detection algorithms respectively. It can be observed from Table 1 that both tapering and maxSIR beamforming algorithms achieve satisfying performance, and could be promising candidates for the real product. In addition, with tapering BF algorithm and single user IRC detection algorithm, the receiver device achieves relatively good performance (enough for 6-layer multi-user MIMO) with low complexity.

TABLE 1

| Link level simulation result for a proposed receiver device | | | | |
|---|---|---|---|---|
| BF Method | Tapering | | MaxSIR | |
| Receiver type | MU-IRC | SU-IRC | MU-IRC | SU-IRC |
| UE1 | —/ | —/0.23 | 28.863 | —/0.12 |

TABLE 1-continued

Link level simulation result for a proposed receiver device

| BF Method | Tapering | | MaxSIR | |
|---|---|---|---|---|
| Receiver type | MU-IRC | SU-IRC | MU-IRC | SU-IRC |
| UE2 | 29.684 | —/0.29 | 25.614 | 18.456 |
| UE3 | 20.62 | 6.535 | 9.179 | 4.359 |
| UE4 | 29.585 | 12.559 | 15.747 | 10.172 |
| UE5 | 14.08 | 7.114 | 9.049 | 5.254 |
| UE6 | 7.646 | 3.296 | 5.331 | 1.078 |
| UE7 | 6.991 | 5.536 | 5.52 | 0.605 |
| UE8 | 34.543 | 10.032 | 11.317 | 6.069 |

Although some of the above description is made in the context of a wireless communication system shown in FIG. 1, it should not be construed as limiting the spirit and scope of the present disclosure. The principle and concept of the present disclosure may be more generally applicable to other scenarios.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (for example, procedures, functions, and so on) that perform the functions described herein.

For example rather than limitation, the BBU and the RRU of a receiver device according to an embodiment of the present disclosure may include one or more processors, such as a data processor (DP) and one or more memories (MEM) coupled to the processor. The BBU and the RRU of a receiver device may further include a transmitter TX and receiver RX coupled to the processor. The MEM may be non-transitory machine readable storage medium and it may store a program or a computer program product (PROG). The PROG may include instructions that, when executed on the associated processor, enable the apparatus to operate in accordance with the embodiments of the present disclosure, for example to perform some or all operations of the method 800, or perform functions of one or more processing units included in the BBU or RRU shown in FIG. 3, 5, 6 or 7. A combination of the one or more processors and the one or more MEMs may form processing means adapted to implement various embodiments of the present disclosure.

The MEMs may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors may be of any type suitable to the local technical environment, and may include one or more of general purpose computers, special purpose computers, microprocessors, DSPs, Field Programmable Gate Array (FPGA) and processors based on multicore processor architecture, as non-limiting examples. For example rather than limitation, some processing units shown in FIGS. 3 and 5-7 may be implemented via DSP.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. The protection sought herein is as set forth in the claims below.

Some abbreviations used in the present disclosure and their corresponding expressions are list below:
BBU Baseband Unit
BLER Block Error Rate
BS Base Station
CPRI Common Public Radio Interface
DMRS De-Modulation Reference Signal
DSP Digital Signal Processor
FDD Frequency Division Duplex
FFT Fast Fourier Transformation
IRC Interference Rejection Combining
I/Q In-phase/Quadrature
LTE Long Term Evolution
MIMO Multi-Input Multi-Output
MRC Maximum Ratio Combining
MU-MIMO Multi-user MIMO
OBSAI Open Base Station Architecture Initiative
OFDM Orthogonal Frequency Division Multiplexing
PUCCH Physical Uplink Control Channel
PUSCH Physical Uplink Shared Channel
RP3 Reference Point 3
RRU Remote Radio Unit
SNR Signal-to-Noise Ratio
SIR Signal-to-Interference Ratio
SFP Small Form-factor Pluggable
SRS Sounding Reference Signal
TDD Time Division Duplexing.

What is claimed is:
1. A receiver device comprising:
one or more processors; and
a memory including instructions, the memory and the instructions configured, with the one or more processors, to cause the receiver device to:
receive, at a remote radio unit of the receiver device, a first set of signals from a first number of receiving antennas;
obtain, at a baseband unit of the receiver device, the first set of signals from the remote radio unit;
generate, at the baseband unit, a second set of signals associated with a second number of virtual antennas by performing receiving beamforming for the obtained first set of signals based on correlation of the first number of receiving antennas and determining, based on the correlation, one or more virtual beams to a direction of a user, the second number of virtual antennas being less than the first number of receiving antennas;
detect, at the baseband unit, the second set of signals.

2. The receiver device of claim 1, wherein the memory and the instructions are further configured, with the one or more processors, to cause the baseband unit to:
obtain the first set of signals;
generate a third set of signals by transforming the first set of signals from time domain to frequency domain; and output the third set of signals; and
perform the receiving beamforming for the third set of signals to generate the second set of signals.

3. The receiver device of claim 1, wherein the memory and the instructions are further configured, with the one or more processors, to cause the baseband unit to:
obtain reference signals from the first number of receiving antennas; and
generate beamforming weights based on received reference signals.

4. The receiver device of claim 1, wherein the memory and the instructions are further configured, with the one or more processors, to cause the baseband unit to:
obtain channel estimation for the second set of signals; and
perform equalization and decoding for the second set of signals based on the obtained channel estimation.

5. A receiver device comprising:
one or more processors; and
a memory including instructions,
the memory and the instructions configured, with the one or more processors, to cause the receiver device to:
receive, at a remote radio unit of the receiver device, a first set of signals from a first number of receiving antennas;
generate, at the remote radio unit, a second set of signals associated with a second number of virtual antennas by performing receiving beamforming for the first set of signals based on correlation of the first number of receiving antennas and determining, based on the correlation, one or more virtual beams to a direction of a user, the second number of virtual antennas being less than the first number of receiving antennas;
obtain, at a base band unit of the receiver device, the second set of signals from the remote radio unit; and
detect, at the base band unit, the second set of signals.

6. The receiver device of claim 5, wherein the memory and the instructions are further configured, with the one or more processors, to cause the remote radio unit to:
obtain the first set of signals;
generate a third set of signals by transforming the first set of signals from time domain to frequency domain; output the third set of signals; and
perform the receiving beamforming for the third set of signals to generate the second set of signals.

7. The receiver device of claim 5, wherein the memory and the instructions are further configured, with the one or more processors, to cause the remote radio unit to:
obtain reference signals from the first number of receiving antennas; and
generate beamforming weights based on received reference signals.

8. The receiver device of claim 5, wherein the memory and the instructions are further configured, with the one or more processors, to cause the base band unit to:
obtain channel estimation for the second set of signals; and
perform equalization and decoding for the second set of signals based on the obtained channel estimation.

9. A method implemented in a receiver device, comprising:
obtaining a first set of signals from a first number of receiving antennas;
generating a second set of signals associated with a second number of virtual antennas by performing receiving beamforming for the first set of signals based on correlation of the first number of receiving antennas and determining, based on the correlation, one or more virtual beams to a direction of a user, the second number of virtual antennas being less than the first number of receiving antennas; and
detecting the second set of signals.

10. The method of claim 9, wherein
obtaining the first set of signals comprises:
receiving, at a baseband unit of the receiver device, the first set of signals from a remote radio unit of the receiver device; and
generating and detecting the second set of signals comprises:
generating and detecting the second set of signals at the baseband unit of the receiver device.

11. The method of claim 9, wherein performing receiving beamforming for the first set of signals comprises:
obtaining a third set of signals by transforming the first set of signals from time domain to frequency domain; and
performing the receiving beamforming for the third set of signals to generate the second set of signals.

12. The method of claim 9, wherein
obtaining the first set of signals comprises:
obtaining, at a remote radio unit of the receiver device, the first set of signals from the first number of receiving antennas;
generating the second set of signals comprises:
generating the second set of signals at the remote radio unit; and
detecting the second set of signals comprises:
obtaining, at a baseband unit of the receiver device, the second set of signals from the remote radio unit; and
detecting the second set of signals at the baseband unit.

13. The method of claim 9, wherein performing receiving beamforming for the first set of signals comprises:
generating beamforming weights based on reference signals received from the first number of receiving antennas; and
performing receiving beamforming for the first set of signals using at least the generated beamforming weights to generate the second set of signals.

14. The method of claim 13, wherein the first number of receiving antennas is N, the second set of signals has M signals, the second number of virtual antennas is M, M<N, and the performing receiving beamforming for the first set of signals using at least the generated beamforming weights further comprises summing results of multiplying the beamforming weights by corresponding signals from the first set of signals to create the second set of signals, wherein the summing and multiplying are performed over a number of sub-arrays of virtual antennas in the M virtual antennas, a number of users, and the N receiving antennas.

15. The method of claim 9, wherein detecting the second set of signals comprises:
   obtaining channel estimation for the second set of signals; and
   performing equalization and decoding for the second set of signals based on the obtained channel estimation.

16. A receiver device comprising:
   one or more processors; and
   a memory including instructions,
   the memory and the instructions configured, with the one or more processors, to cause the receiver device to:
   obtain a first set of signals from a first number of receiving antennas;
   generate a second set of signals associated with a second number of virtual antennas by performing receiving beamforming for the first set of signals based on correlation of the first number of receiving antennas and determining, based on the correlation, one or more virtual beams to a direction of a user, the second number of virtual antennas being less than the first number of receiving antennas; and
   detect the second set of signals.

* * * * *